United States Patent
Teshome et al.

(10) Patent No.: US 10,146,610 B2
(45) Date of Patent: Dec. 4, 2018

(54) AGENTLESS REMEDIATION AND RECOVERY

(71) Applicant: Dell Products, L.P., Round Rock, TX (US)

(72) Inventors: Abeye Teshome, Austin, TX (US); Joseph Kozlowski, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 86 days.

(21) Appl. No.: 15/478,211

(22) Filed: Apr. 3, 2017

(65) Prior Publication Data
US 2018/0285180 A1    Oct. 4, 2018

(51) Int. Cl.
*G06F 11/00* (2006.01)
*G06F 11/07* (2006.01)

(52) U.S. Cl.
CPC .......... *G06F 11/079* (2013.01); *G06F 11/006* (2013.01); *G06F 11/0721* (2013.01); *G06F 11/0757* (2013.01); *G06F 2201/81* (2013.01)

(58) Field of Classification Search
CPC ....... G06F 11/3058; G06F 11/00; G06F 11/22
USPC ..................................................... 714/22, 20
See application file for complete search history.

(56) References Cited

U.S. PATENT DOCUMENTS

| | | | |
|---|---|---|---|
| 2012/0110380 A1* | 5/2012 | Verdun ..................... | G06F 1/26 714/24 |
| 2014/0257828 A1* | 9/2014 | Thornley ................ | G06F 11/00 705/2 |
| 2016/0116961 A1* | 4/2016 | Kunnathur Ragupathi ................. | G06F 1/32 713/320 |
| 2016/0246528 A1* | 8/2016 | Colgrove ............. | G06F 3/0622 |
| 2018/0205595 A1* | 7/2018 | Abbondanzio ..... | H04L 41/0654 |

* cited by examiner

*Primary Examiner* — Sarai E Butler
(74) *Attorney, Agent, or Firm* — Fogarty LLP

(57) ABSTRACT

Systems and methods for agentless remediation and recovery. In an illustrative, non-limiting embodiment, an Information Handling System (IHS) may include a Central Processing Unit (CPU); a Basic Input/Output System (BIOS) coupled to the CPU; a logic controller coupled to the CPU; and a memory coupled to the logic controller, the memory having program instructions stored thereon that, upon execution by the logic controller, cause the IHS to: during a first stage, check an operational state of a plurality of hardware components within the IHS in the absence of any involvement by the CPU or the BIOS; and during a second stage following the first stage, identify a failed hardware component amongst the plurality of hardware components in the absence of any involvement by the CPU or the BIOS.

20 Claims, 2 Drawing Sheets

1

AGENTLESS REMEDIATION AND RECOVERY

FIELD

This disclosure generally relates to Information Handling Systems (IHSs), and, more particularly, to systems and methods for agentless remediation and recovery.

BACKGROUND

As the value and use of information continue to increase, individuals and businesses seek additional ways to process and store information. An option is an Information Handling System (IHS). An IHS generally processes, compiles, stores, and/or communicates information or data for business, personal, or other purposes.

Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, global communications, etc.

In addition, IHSs may include a variety of hardware and software components that may be configured to process, store, and communicate information; and may include one or more computer systems, data storage systems, and/or networking systems.

As the inventors hereof have recognized, IHS mobility is increasingly becoming a pillar of today's business strategy. It is transforming productivity, business processes, customer interaction, and servicing. But greater mobility presents unique challenges. Key among these challenges is minimizing downtime and remotely servicing devices and IHS environments.

To participate in remote remediation and recovery, a conventional IHS relies upon its Operating System (OS) or service OS being capable of being executed, and/or upon its hardware being healthy, so that it can communicate with a remote remediation and recovery service.

SUMMARY

Embodiments of systems and methods for agentless remediation and recovery are described. In an illustrative, non-limiting embodiment, an Information Handling System (IHS) may comprise: a Central Processing Unit (CPU); a Basic Input/Output System (BIOS) coupled to the CPU; a logic controller coupled to the CPU; and a memory coupled to the logic controller, the memory having program instructions stored thereon that, upon execution by the logic controller, cause the IHS to, during a first stage, check an operational state of a plurality of hardware components within the IHS in the absence of any involvement by the CPU or the BIOS.

During a second stage following the first stage, the program instructions may cause the IHS to identify a failed hardware component amongst the plurality of hardware components in the absence of any involvement by the CPU or the BIOS. To check the operational state, the program instructions may further cause the IHS to: compare a current IHS map with a previous IHS map, and identify a power failure based upon the comparison. Additionally or alternatively, to check the operational state, the program instructions may further further cause the IHS to recognize a timer expiration, a code execution failure, or a ready bit.

To identify the failed hardware component, the program instructions may further cause the IHS to check a plurality of voltage rails output by a voltage regulator. Additionally or alternatively, to identify the failed hardware component, the program instructions, upon execution, further cause the IHS to check dependencies between two or more voltage rails. The program instructions may further cause the IHS to configure the voltage regulator to provide more electrical current on a subset of phases and to disable at least one phase.

To identify the failed hardware component, the program instructions may cause the IHS to check execution of code by the embedded controller. The program instructions may cause the IHS to detect a failed initialization of the code or to identify a failed code execution indicator. Additionally or alternatively, the program instructions may cause the IHS to perform code-tree tracking and restart. Additionally or alternatively, the program instructions may cause the IHS to re-image a firmware portion of the embedded controller.

In some cases, the program instructions, upon execution, further cause the IHS to, during a third stage following the second stage, use the BIOS to change a boot order of the IHS.

In another illustrative, non-limiting embodiment, a method may implement one or more of the aforementioned operations. In yet another illustrative, non-limiting embodiment, a hardware memory storage device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

In various embodiments, systems and methods described herein may employ techniques for agentless remediation and recovery. In many cases, these techniques may employ secure "very low level communication" (VLLC) techniques operating below the Basic Input/Output System (BIOS). In various implementations, these techniques may be independent of the operational state of the host CPU or the IHS's OS, but can utilize the CPU if it is available.

In many cases, techniques described herein may be applied in different stages. Generally, an IHS such as described herein may be capable of communicating remotely at each stage, and it may autonomously proceed to subsequent stage(s) based upon the outcome(s) of the previous stage(s).

For example, in a first stage, systems and methods described herein may employ state-driven check of the hardware that is independent of the CPU, OS or BIOS. In a second stage, systems and methods described herein may employ firmware-based iterative algorithms to bound and isolate the failure. Then, in a third stage, systems and methods described herein may extend these capabilities through partial, or full BIOS interaction. As such, these techniques can enable remote remediation of systems in areas not otherwise considered remotely serviceable.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a CPU or hardware or software control logic, Read-Only Memory (ROM), and/or other types of nonvolatile memory.

Additional components of an IHS may include one or more disk drives, one or more network ports for communicating with external devices as well as various input/output (I/O) devices, such as a keyboard, a mouse, a touchscreen, and/or a video display. An IHS may also include one or more buses operable to transmit communications between the various hardware components. An example of an IHS is described in more detail below.

Figure 1:
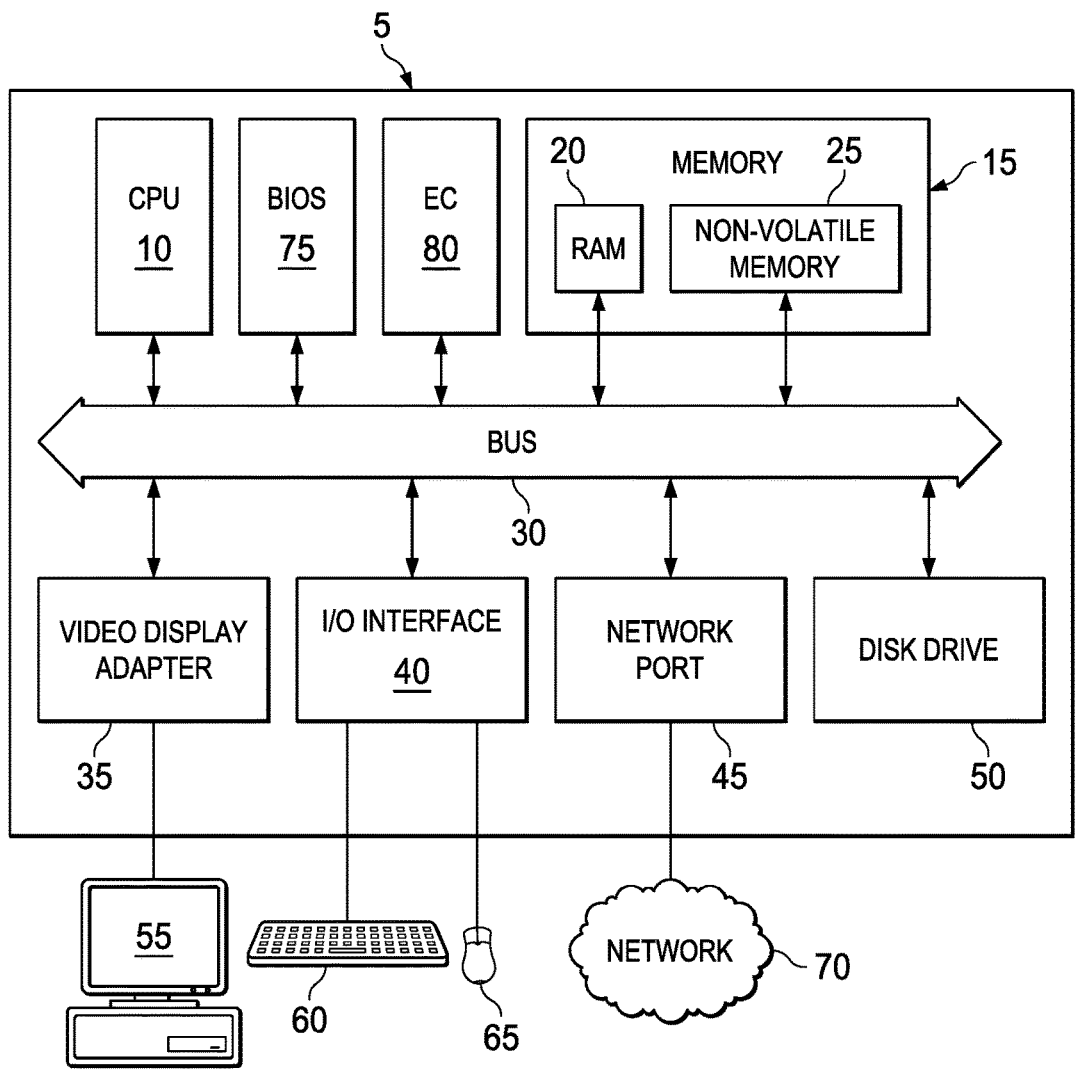
FIG. 1 is a block diagram of an example of an IHS configured to perform agentless remediation and recovery according to some embodiments.

FIG. 1 shows an example of IHS 5 configured to implement systems and methods described herein. It should be appreciated that although certain embodiments described herein may be discussed in the context of a desktop or server computer, other embodiments may be utilized with virtually any type of IHS. In this embodiment, IHS 5 is configured to implement techniques for agentless remediation and recovery, as explained in more detail below.

As shown, IHS 5 includes main processor or CPU 10. Main processor 10 may be a processor, a microprocessor, minicomputer, or any other suitable processing device, including combinations and/or a plurality thereof, capable of or configured to execute program instructions. For example, execution of an algorithm or software configured to implement techniques described herein may occur, at least in part, within main processor 10.

Main processor 10 may be in data communication over a local interface bus 30 with a variety of components. Examples of such components include, but are not limited to: memory 15, Input/Output (I/O) interface 40, network port or adaptor 45, disk drive 50, Basic Input/Output System (BIOS) 75, Embedded Controller (EC) 80, and video display adapter 35.

Memory 15, as illustrated, may include volatile memory 20 (e.g., random access memory or "RAM") and/or non-volatile memory 25. The IHS's Operating System and application programs may be loaded into RAM 20 for execution. As used herein, the term "OS" generally refers to a set of programs that control operations of the IHS and allocation of resources. An application program runs on top of the OS and uses computer resources made available through the OS to perform application specific tasks desired by a user.

Non-volatile memory 25 may include, but is not limited to, flash memory, non-volatile random access memory (NVRAM), or electrically erasable programmable read-only memory (EEPROM). In some cases, non-volatile memory 25 may contain firmware or the like, which may include persistent programming and/or executable instructions for managing certain aspects, devices, and/or components of IHS 5.

Input/Output (I/O) interface 40 is responsible for providing a number of I/O ports, including a keyboard port, a mouse port, a serial interface, a parallel port, etc. to IHS 5. As such, I/O interface 40 may be coupled to keyboard 60, mouse 65, and/or other I/O devices.

Network port or adaptor 45 enables communications over network 70, such as a local area network (LAN) or a wide area network (WAN), such as the Internet.

Disk drive 50 is a storage device where data is recorded persistently using various electronic, magnetic, optical, and/or mechanical techniques. Examples of disk drive 50 include a hard disk drive (HDD), a solid-state drive (SSD), a hybrid drive, an optical disc drive, etc.

Basic Input/Output System (BIOS) 75 is a type of firmware used during the booting process (reset or startup) of IHS 5 that contains the first software that is executed when IHS 5 is powered on. BIOS 75 includes BIOS program code containing the basic routines that help to start up IHS 5 and to transfer information between elements within IHS 5. In some implementations, BIOS 75 may include firmware compatible with the EFI Specification and Framework. In operation, BIOS 75 is configured to initialize and test the IHS's hardware components in a configurable "boot order," and also to load a boot loader or an Operating System (OS) from a memory. In modern systems, BIOS 75 includes flash memory so it can be rewritten without having to physically remove the chip from IHS 5.

Embedded Controller (EC) 80 enables management of various components of IHS 5. For example, EC 80 may interface with a keyboard to accept end user inputs (e.g., via I/O interface 40), and it may provide many different system management functions, such as power management, thermal management, etc. In various embodiments, EC 80 may be configured to implement one or more aspects of the systems and methods for agentless remediation and recovery described herein.

Video display adapter 35 includes a video card and/or video hardware integrated into the IHS's motherboard or CPU 10. Motherboard-based implementations are sometimes called "on-board video," while CPU-based implementations are known as Accelerated Processing Units (APUs). Many modern IHSs have motherboards with integrated graphics that also allow the disabling of the integrated graphics chip in BIOS 75, and have a PCI, or PCI Express (PCI-E) slot for adding a higher-performance graphics card in place of the integrated graphics. As such, video display adapter 35 may be used to feed video and images to display 55.

In some cases, display 55 includes a Liquid Crystal Display (LCD). The LCD display may include, for example a backlight and/or may be capable of refresh rates of at least 30 frames per second. In other cases, display may be a hybrid display that can be used as either a conventional LCD-type display (with a backlight turned on) or an e-ink display that can often maintain a static image on display for long periods of time (e.g., minutes, hours, days, etc.) in the absence of refresh and/or without any backlight turned on.

It should be appreciated that, in other embodiments, the IHS may comprise any device that executes software, including embedded systems such as, for example, cable-top boxes, phones, media devices, game consoles, telephony equipment, traffic lights, automotive vehicles, avionics, factory controllers, etc. Each of these devices may have its own power and display requirements. It is also contemplated that an IHS may not include all of the components shown in FIG. 1, may include other components that are not explicitly shown, or may utilize a different architecture.

For instance, an IHS may be implemented as an "IoT" device. The Internet-of-Things (IoT) is an inter-networking of "things" or "objects" (generally referred to as "IoT devices") that promotes the collection and exchange of data among those objects. Generally speaking, IoT technology allows IoT devices to operate remotely across a network infrastructure to integrate the physical world into computer-based systems using a variety of different communication protocols.

To name but a few examples, in the field of manufacturing, IoT may be used in process automation (chemicals, food, beverage, pharmaceuticals), discrete automation (auto, machine, electronics), and industrial equipment. In the field of transportation and logistics, IoT may be used in air, automotive, marine, or rail transport, fleet and freight management, cold chain logistics, traffic systems, public transit and travel, and usage insurance. In the energy field, IoT may be used in power generation and distribution, smart grids, oil and gas, and renewable energy. In communications, IoT may be used to support various information technology (IT) services, network services, data centers, and communication equipment. With respect to natural resources, IoT may be used in agriculture, metals and minerals mining, water and waste management, forestry, fishing, and livestock, and golf courses. In healthcare, IoT may be used in hospitals, home care, health care plans, medical laboratories, biotechnology, and medical appliances and equipment. And in retail and hospitality, IoT may be used in hotels, vending machines, amusement parks, restaurants, sports and entertainment, etc.

IoT device architectures can vary widely from device to device, ranging from legacy sensors and actuators (e.g., interfaced via adaptors, hubs, or other circuitry that provides network connectivity) to sophisticated embedded devices and IHSs, such as IHS 5 of FIG. 1.

In some cases, an IoT device may include a processing circuit, a signal conditioning circuit, a wireless interface circuit, and/o a wired interface circuit. The processing circuit may include (or be akin to) CPU 10, or it may be any other suitable type of processor or controller. The signal conditioning circuit may include digital/analog processing circuitry, digital-to-analog converter, and analog-to-digital converter.

The wireless interface may include any hardware, circuitry, and/or software that enables the IoT device to receive and/or transmit data over a wireless medium (e.g., network 70). Examples of wireless networks include, but are not limited to, Wi-Fi, Bluetooth, BLE, ZigBee, Z-wave, 6LoWPAN, Thread, Sigfox, LoRA, WirelessHD, WiGig, HaLow, NFC, RFID, SigFox LoRaWAN, Ingenu, Weightless, ANT, DigiMesh, MiWi EnOcean, Dash7, or WirelessHART networks, cellular networks (e.g., second generation (2G), third generation (3G), fourth generation (4G), a Long Term Evolution (LTE), a fifth generation (5G) network), and satellite networks.

The wired interface may include any hardware, circuitry, and/or software that enables the IoT device to receive and/or transmit data over a wired medium (e.g., network 70). Examples of wired networks include Ethernet, cable, optical fiber, USB, HDMI, DSL, PowerLine, HomePlug, HomePNA, X10, and Public Switched Telephone Networks (PSTN). Additionally or alternatively, the wired interface may include circuitry configured to receive and transmit digital signals or data such as, for example, RS232, RS485, CANbus, RS422, USB, video signals (e.g., to and from a monitor or camera), and GPIO. Additionally or alternatively, the wired interface may be used to transmit and receive analog signals usable to indicate and/or to control the status of buttons, switches, contactors, actuators, etc.

It should be noted that, it many applications, any hardware equipment used to interconnect any component in an IoT network may itself be an IoT device (e.g., a wireless access point, a network switch, a legacy sensor hub or aggregator, etc.). Additionally or alternatively, in many applications, otherwise conventional IHS devices, such as, for example, computers, desktops, smart phones, tablets, etc., may also operate as IoT devices.

Figure 2:
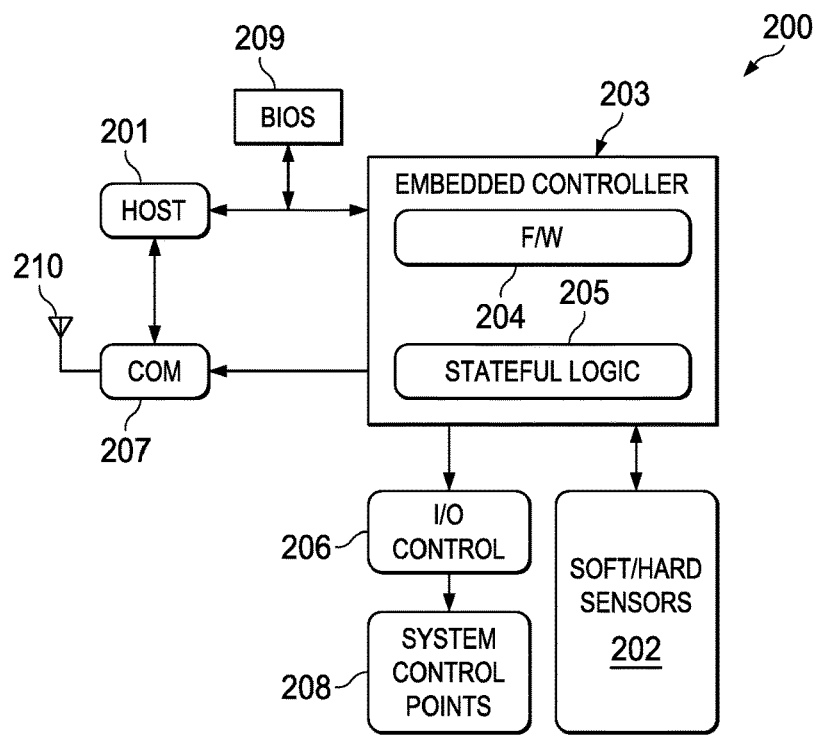
FIG. 2 is a block diagram of an example of an IoT device configured to perform agentless remediation and recovery according to some embodiments.

Turning now to FIG. 2, a block diagram of device 200 configured to perform agentless remediation and recovery is depicted. In some embodiments, device 200 may include host processor or controller 201 (e.g., CPU 10 in FIG. 1), BIOS 209 (e.g., BIOS 75 in FIG. 1), and Embedded Controller or EC 203 (e.g., EC 80 in FIG. 1).

EC 203 includes firmware 204 and stateful logic 205, and it is coupled I/O control interface 206, which in turn is coupled to system control points 208. In some cases, EC 203 may have a processing or CPU core of its own. Examples of control points 208 include, but are not limited to, power, I/O, GPIO, registers, p-switches, etc. EC 203 is also coupled to software and/or hardware sensors 202. Examples of sensors 202 include, but are not limited to, continuity, power, current, timing, code execution, etc. Both EC 203 and host 201 are coupled to communication interface 207, which may be coupled to antenna 210 or other communication device or medium.

Figure 3:
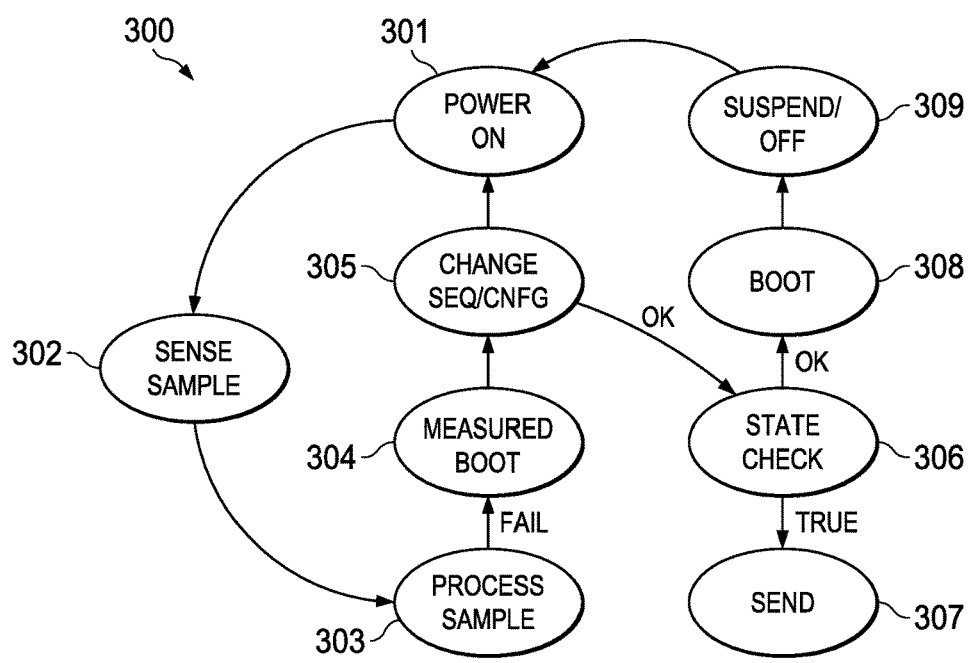
FIG. 3 is a state diagram of an example of a method for agentless remediation and recovery according to some embodiments.

Operation of device 200 is illustrated with respect to FIG. 3, where a state diagram of an example of method 300 for agentless remediation and recovery is depicted. Particularly, method 300 begins at state 301, where IHS 100 or device 200 is powered on. At state 302, method 300 includes sampling data from or about one or more sensors (e.g., sensors 202 in FIG. 2). At state 303, method 300 processes the sampled data. If the processing indicates a failure, method 300 then invokes a measured boot at state 304, and determines whether to change the boot sequence at state 305.

At 306, method 300 performs a state check, that is, a comparison between the current failure and previous failures to determine how many attempts have been tried, which boot orders have been unsuccessful, etc. In this case, if state check is true, state 307 sends a communication to another component of the IHS 100 or device 200, and/or over communication interface 207 indicating the failure, the current boot order, etc.

If state check 306 determines that the current boot attempt is the first attempt using a selected one of a plurality of different boot orders, method 300 boots up IHS 100 or device 200, suspends or turns off the device at state 309, and then powers it back on at state 301.

IMPLEMENTATION EXAMPLES

In a first scenario, consider an IoT device or IHS isolated in a remote location, such that onsite service is expensive and/or time constrained. In some cases, the IoT device or IHS may self-check every n-boots and, at some point, the IoT device may fail to boot. Stateful logic 205, under control of instructions stored in firmware 204, may recognize the failed state (e.g., using a timer, code execution failure, "ready-bit," etc. . . . ). Then, stateful logic 205 may analyze and/or compare current sensor amalgamation data with the last successful sensor map.

For example, the comparison may indicate a power-related failure. In response, stateful logic 205 may enable all power sensors and it may restart. For instance, stateful logic 205 may identify an issue with output phase or power module m of voltage regulator or power supply n. As such, stateful logic 205 may reconfigure the voltage regulator's controller to provide more electrical current on remaining phases and/or to disable phase m.

In some cases, to identify the failed hardware component, stateful logic 205 may further cause the IHS to check a plurality of voltage rails output by a voltage regulator. Moreover, EC 203 may store dependencies between a plurality of voltage rails (e.g., if a second voltage rail is a regulated output of a first voltage rail, then the second rail depends upon the first rail), for example, in a database or the like. As such, to identify the failed hardware component, stateful logic 205 may cause the IHS to check dependencies between two or more voltage rails (e.g., if the second rail fails, the first rail is also checked, and so on).

Stateful logic 205 may employ a measured restart or reboot to monitor the reconfiguration. For example, stateful logic 205 may reroute power using one or more multiplexers or switches to power up a CPU core in a reduced capacity. If the reboot is successful, stateful logic 205 may restart to boot, thereby restoring full or selected functionality to the IoT device.

Moreover, stateful logic 205 may communicate the issue and remediation information to a remote control entity, such as a backend server or the like, to schedule remote or on-site service, etc. For example, the information may include the identification of a power regulator and/or power regulator phase or power module that has failed, whether that regulator or power module is on a motherboard or daughterboard, what part number needs to be changed, etc.

As another scenario, consider firmware corruption. A corrupt firmware prevents the boot and several causes are possible (e.g., dirty power, unplanned run-time issue, over voltage, compromised, static induced, etc.). In this case, stateful logic 205, under control of instructions stored in firmware 204, may recognize the failed state (e.g., timer, code execution failure, "ready-bit", etc.). Again, stateful logic 205 may analyze and compare current sensor amalgamation to a last successful sensor map, and the comparison may indicate that the failure is not a power failure.

Stateful logic 205 may then identify a failed code execution indicator "set," which indicates that the initialization suffered an unexpected code execution event. In response, stateful logic 205 may enable code-tree tracking and it may restart the IoT device or IHS. Examples of code-tree tracking include, but is note limited to, an automated or semi-automated traversal and/or analysis of an abstract syntax tree (AST).

Stateful logic 205 may validate the firmware corruption by identifying and comparing repeated failure position or behavior, and it may communicate the issue and remediation to a remote server. Then, stateful logic 205 may use secure communication to re-image firmware 204. The remote server restarts the IoT device or IHS. An agentless method validates system boot, sends directed update, and validates/mirrors the system after the update.

It should be understood that various operations described herein may be implemented in software executed by logic or processing circuitry, hardware, or a combination thereof.

The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    a Central Processing Unit (CPU);
    a Basic Input/Output System (BIOS) coupled to the CPU;
    a logic controller coupled to the CPU; and
    a memory coupled to the logic controller, the memory having program instructions stored thereon that, upon execution by the logic controller, cause the IHS to:
        during a first stage, check an operational state of a plurality of hardware components within the IHS in the absence of any involvement by the CPU or the BIOS; and
        during a second stage following the first stage, identify a failed hardware component amongst the plurality of hardware components in the absence of any involvement by the CPU or the BIOS.

2. The IHS of claim 1, wherein to check the operational state, the program instructions, upon execution, further cause the IHS to: compare a current IHS map with a previous IHS map, and identify a power failure based upon the comparison.

3. The IHS of claim 1, wherein to check the operational state, the program instructions, upon execution, further cause the IHS to recognize a timer expiration, a code execution failure, or a ready bit.

4. The IHS of claim 1, wherein to identify the failed hardware component, the program instructions, upon execution, further cause the IHS to check a plurality of voltage rails output by a voltage regulator.

5. The IHS of claim 4, wherein to identify the failed hardware component, the program instructions, upon execution, further cause the IHS to check dependencies between two or more voltage rails.

6. The IHS of claim 4, wherein the program instructions, upon execution, further cause the IHS to configure the voltage regulator to provide more electrical current on a subset of phases and to disable at least one phase.

7. The IHS of claim 1, wherein to identify the failed hardware component, the program instructions, upon execution, further cause the IHS to check execution of code by the embedded controller.

8. The IHS of claim 7, wherein the program instructions, upon execution, further cause the IHS to detect a failed initialization of the code or to identify a failed code execution indicator.

9. The IHS of claim 8, wherein the program instructions, upon execution, further cause the IHS to perform code-tree tracking and restart.

10. The IHS of claim 8, wherein the program instructions, upon execution, further cause the IHS to re-image a firmware portion of the embedded controller.

11. The IHS of claim 1, wherein the program instructions, upon execution, further cause the IHS to, during a third stage following the second stage, use the BIOS to change a boot order of the IHS.

12. A hardware memory device having program instructions stored thereon that, upon execution by an embedded controller of an Information Handling System (IHS), cause the IHS to:
 during a first stage, check an operational state of a plurality of hardware components within the IHS, wherein the IHS includes a Central Processing Unit (CPU) and a Basic Input/Output System (BIOS), and wherein the checking occurs in the absence of any involvement by the CPU or the BIOS;
 during a second stage following the first stage, identify a failed hardware component amongst the plurality of hardware components in the absence of any involvement by the CPU or the BIOS; and
 during a third stage following the second stage, use the BIOS to change a boot order of the IHS in response to the identification.

13. The hardware memory device of claim 12, wherein to check the operational state, the program instructions, upon execution, further cause the IHS to: compare a current IHS map with a previous IHS map, and identify a power failure based upon the comparison.

14. The hardware memory device of claim 12, wherein to check the operational state, the program instructions, upon execution, further cause the IHS to recognize a timer expiration, a code execution failure, or a ready bit.

15. The hardware memory device of claim 12, wherein to identify the failed hardware component, the program instructions, upon execution, further cause the IHS to check a plurality of voltage rails output by a voltage regulator, and to check dependencies between two or more voltage rails.

16. The hardware memory device of claim 15, wherein the program instructions, upon execution, further cause the IHS to configure the voltage regulator to provide more electrical current on a subset of phases and to disable at least one phase.

17. A computer-implemented method, comprising:
 during a first stage of operation of an embedded controller of an Information Handling System (IHS), checking an operational state of a plurality of hardware components within the IHS, wherein the IHS includes a Central Processing Unit (CPU) and a Basic Input/Output System (BIOS), and wherein the checking occurs in the absence of any involvement by the CPU or the BIOS;
 during a second stage following the first stage, identifying a failed hardware component amongst the plurality of hardware components in the absence of any involvement by the CPU or the BIOS; and
 during a third stage following the second stage, using the BIOS to change a boot order of the IHS in response to the identification.

18. The computer-implemented method of claim 17, further comprising detecting a failed initialization of the code or identifying a failed code execution indicator.

19. The computer-implemented method of claim 18, further comprising performing code-tree tracking and restart.

20. The computer-implemented method of claim 18, further comprising re-imaging a firmware portion of the embedded controller.

* * * * *